United States Patent
Matsushita (10) Patent No.: US 6,341,898 B1
(45) Date of Patent: Jan. 29, 2002

(54) RECEPTACLE, PROCESS FOR PRODUCING THE SAME AND OPTICAL CONNECTOR CONTAINING THE SAME

(75) Inventor: Junichi Matsushita, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/536,717

(22) Filed: Mar. 28, 2000

(30) Foreign Application Priority Data

Sep. 8, 1999 (JP) .......................................... 11-253935

(51) Int. Cl.⁷ ................................................. G02B 6/36
(52) U.S. Cl. .............................. 385/88; 385/76; 385/77; 385/78; 385/92; 385/93; 385/94; 385/139
(58) Field of Search ............................ 385/53, 60, 72, 385/76, 77, 78, 88, 89, 92, 93, 94, 139

(56) References Cited

U.S. PATENT DOCUMENTS

| | | | |
|---|---|---|---|
| 4,533,209 A | * 8/1985 | Segerson et al. | ......... 385/88 X |
| 4,539,476 A | * 9/1985 | Donuma et al. | ......... 385/88 X |
| 4,762,381 A | * 8/1988 | Uemiya et al. | ........... 385/88 X |
| 4,776,659 A | * 10/1988 | Mruk | ........................ 385/88 X |
| 5,044,720 A | * 9/1991 | Haley et al. | ................... 385/88 |
| 5,384,873 A | * 1/1995 | Chen et al. | .................... 385/31 |
| 5,687,270 A | * 11/1997 | Takizawa | ..................... 385/94 |
| 5,852,696 A | * 12/1998 | Collins et al. | ................. 385/88 |
| 6,062,742 A | * 5/2000 | Yuuki | ............................ 385/88 |
| 6,075,911 A | * 6/2000 | Goto | ............................. 385/31 |
| 6,170,996 B1 | * 1/2001 | Miura et al. | ................... 385/94 |
| 6,231,245 B1 | * 5/2001 | Buschelberger et al. | ...... 385/88 |

FOREIGN PATENT DOCUMENTS

JP    6-33443    8/1994    ............... 385/88 X

* cited by examiner

*Primary Examiner*—Brian Healy
(74) *Attorney, Agent, or Firm*—Armstrong, Westerman, Hattori, McLeland & Naughton, LLP (57) ABSTRACT

A receptacle that is useful from the viewpoint of superior workability, low loss of light and low cost is provided as well as a process for producing the recepacle. An optical connector that is inexpensive and contributes to better optical communication is also provided. The receptacle has an optical element module containing lead frame having an optical element and a connector housing having a room for accommodating and placing the lead frame, into which an optical plug having ferrule-mounted optical fibers at the end thereof is plugged. The connector housing contains a socket cavity for receiving the optical plug and a cylinder being in communication with the socket cavity and the room. The optical element module contains a clad formed in the cylinder, a core forming an optical waveguide in combination with the clad, and a molded portion united with the core. The core and the molded portion are made of a light-transmitting transparent resin that is filled into the inside of the clad and the room.

16 Claims, 10 Drawing Sheets

RECEPTACLE, PROCESS FOR PRODUCING THE SAME AND OPTICAL CONNECTOR CONTAINING THE SAME

BACKGROUND OF THE INVENTION (1). Field of the Invention

This invention relates to an optical connector for use in multiple transmission circuits mounted in vehicles such as motorcars, a receptacle composing the optical connector, and a process for producing the receptacle.

(2). Description of the Related Art

As an optical connector, in which a sleeve lies between an optical fiber and an optical element module (sometimes called as light-receiving/light-emitting module, receiver/transmitter module, or fiber optic transceiver (FOT)), an optical connector proposed by the present applicant in Japanese Utility Model Publication No. H6-33443 has been generally known.

Figure 14:
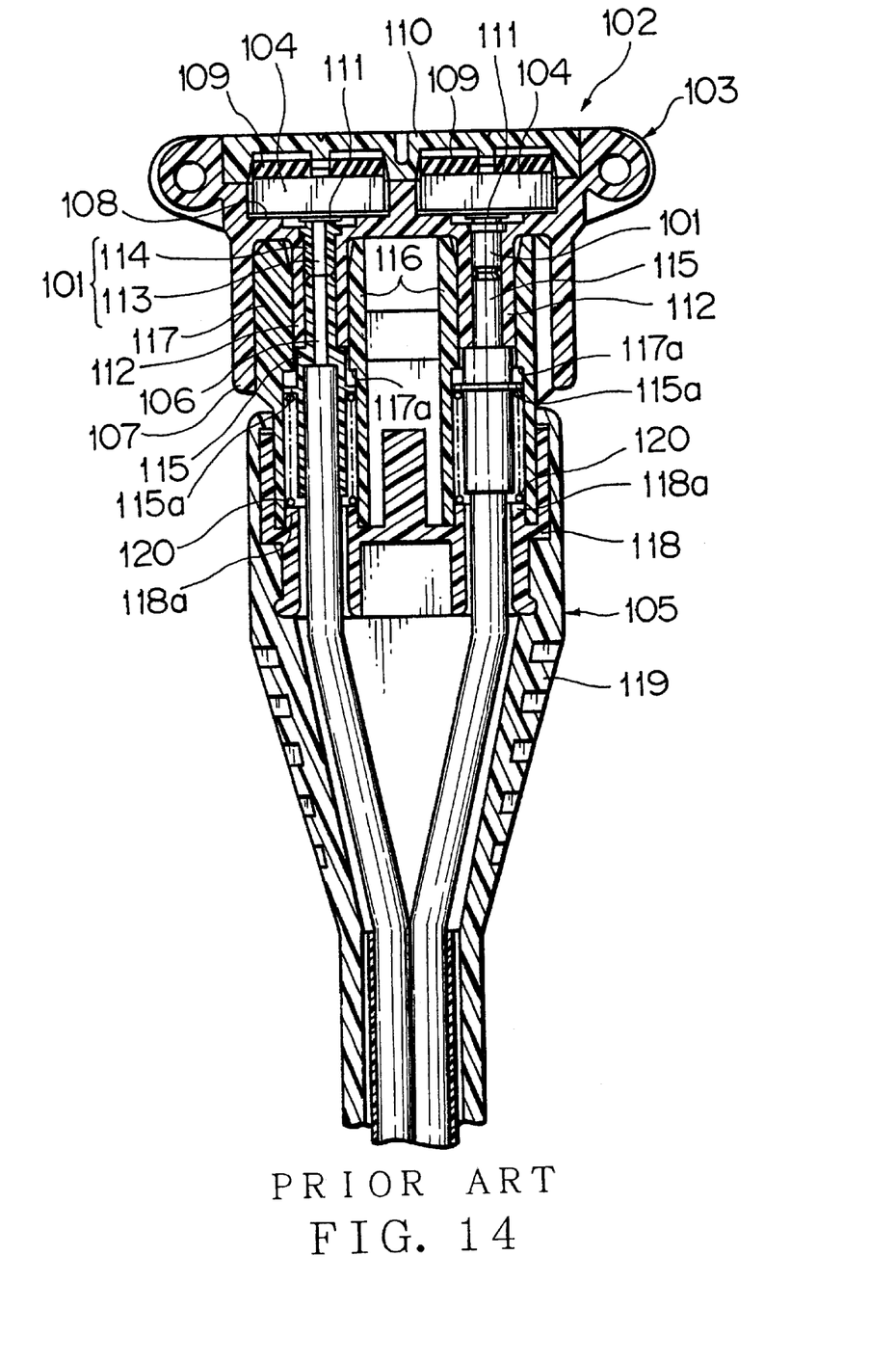
FIG. 14 is a sectional view of a conventional optical connector.

A pair of the above sleeves 101 and optical connector 102 are shown in FIG. 14.

Each sleeve 101, which is mounted in a receptacle 103 (an equipment-side connector) composing an optical connector 102, lies between a corresponding optical element module 104 (a light-emitting element module 104 or a light-receiving element module 104) also mounted in the receptacle 103 and an corresponding optical fiber 106 (only one of two fibers shown in FIG. 14, hereinafter the same) mounted in an optical plug 105 (an optical fiber-side connector) that is plugged into the receptacle 103 to assemble the optical connector 102. Thus, the sleeve 101 is regarded as a component of the optical connector, which is capable of making an optical connection between the optical element module 104 and the optical fiber 106.

The optical connector 102 consists of the receptacle 103 and the optical plug 105 that is plugged into the receptacle 103.

Figure 15:
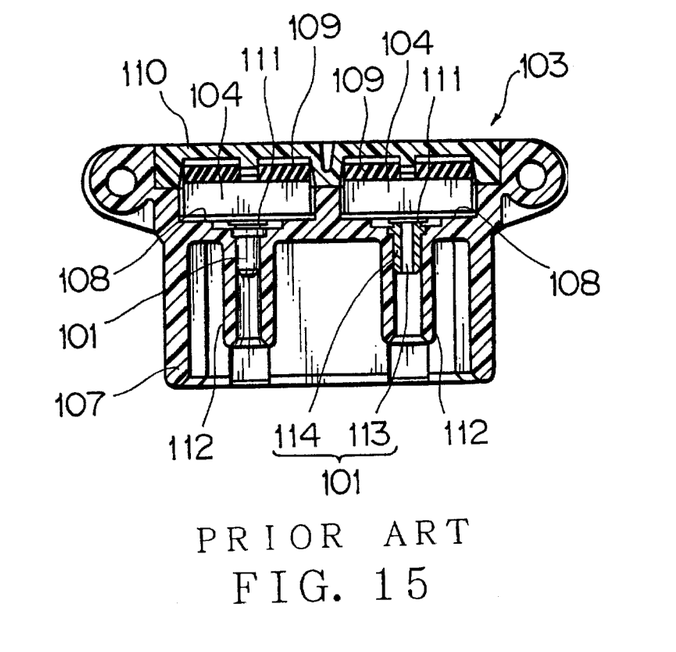
FIG. 15 is a sectional view of the conventional receptacle shown in FIG. 14.

As shown in FIGS. 14 and 15, the receptacle 103 has a housing 107 made of synthetic resin, in which a pair of rooms 108 is provided to receive the corresponding optical element module 104 therein that is supported by a corresponding back sheet 109 consisting of resilient menber such as a rubber, the upper side of which is covered with a cap 110. Under a pair of the rooms 108, in each of which the corresponding optical element module 104 is received, a corresponding cylinder 112 is provided, which extends downward in such a manner that an axis of each cylinder 112 coincides with that of a corresponding lens 111. The sleeve 101 is inserted into the corresponding cylinder 112 to be installed therein.

The sleeve 101 is constructed in such a manner that an optical fiber 113 (multiple-mode plastic optical fiber) consisting of a core and clad (not shown in the figures) is glued to be fixed into a cylindrical holder 114 and both end surfaces of the sleeve 101 is superfinely polished.

Figure 16:
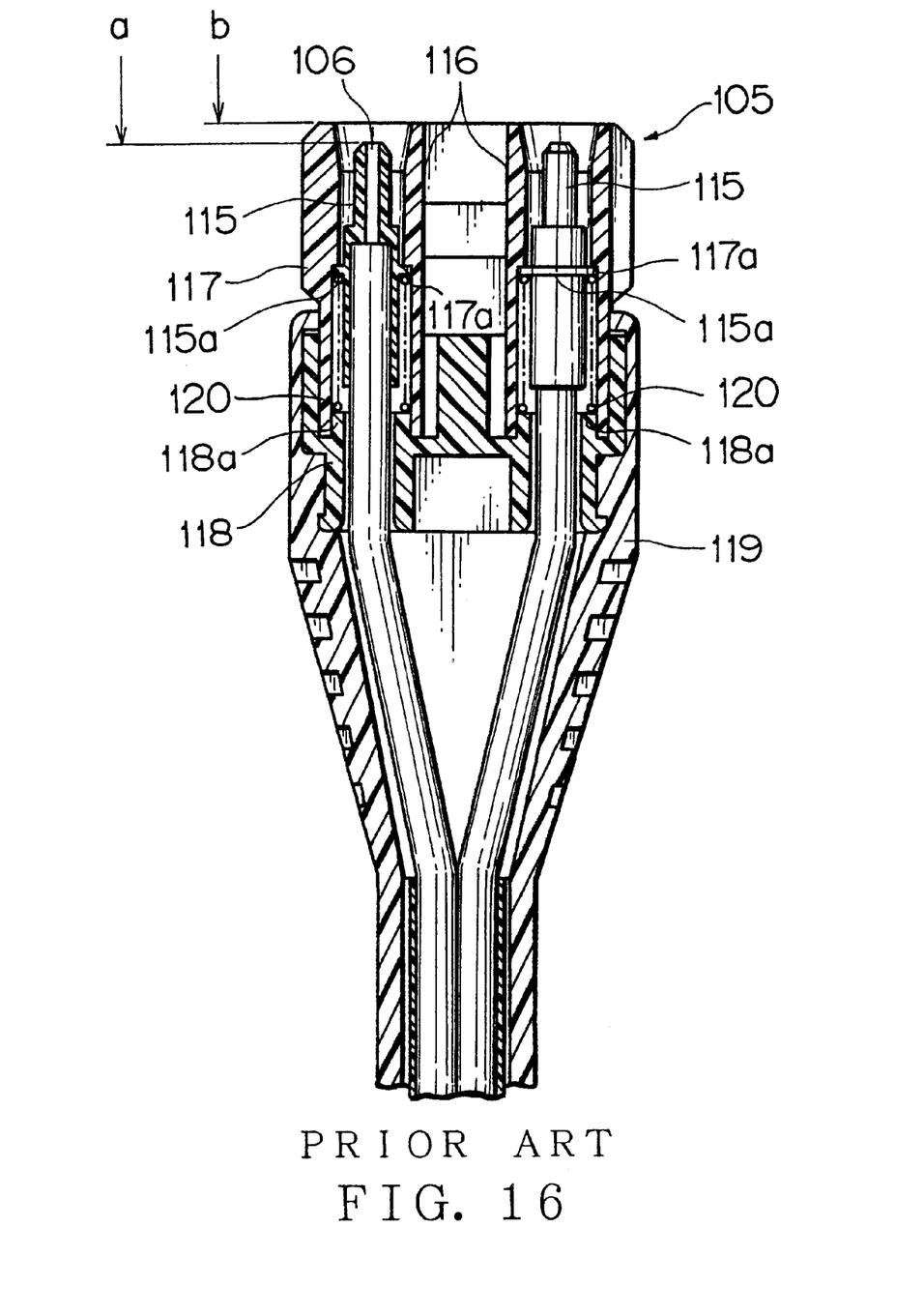
FIG. 16 is a sectional view of the conventional optical plug shown in FIG. 14.

On the other hand, as shown in FIGS. 14 and 16, the optical plug 105, which is plugged into the receptacle 103, contains: a pair of ferrule assemblies 115 each covering the corresponding optical fiber 106 in such a manner that an end surface of the optical fiber 106 is exposed; a plug housing 117 having a cylindrical partition 116 that receives and protects a pair of the ferrule assemblies 115 therein; a spring cap 118 that is fitted to the plug housing 117 to be fixed there; and a boot 119 that is fitted into the lower part of the spring cap 118.

In the plug housing 117, there is formed a pair of shoulders 117a, each of which is fitted to a corresponding flange 115a provided around the outer circumference of a lower portion of the corresponding ferrule assembly 115 and there is provided a pair of springs 120, each of which lies between the corresponding flange 115a and a corresponding inner cylinder 118a of the spring cap 118 so as to constantly press the ferrule assembly 115 upward.

As shown in FIG. 16, when the flange 115a is engaged with the shoulder 117a, an end a of the ferrule assembly 115, which corresponds to an end surface of the optical fiber 106, never come out from a front end b of the plug housing 117.

In the following, a connection between the receptacle 103 and the optical plug 105 is explained with reference to FIG. 14.

When the optical plug 105 is plugged into the receptacle 103, each cylinder 112 enters into the plug housing 117 and each ferrule assembly 115 simultaneously enters into the corresponding cylinder 112. The ferrule assembly 115 abuts against an end of the cylinder 112 and the spring 120 gives a moderate contact pressure therebetween.

In the above situation, the end a (see FIG. 16) and the sleeve 101 are arranged making minimun gap therebetween, thereby a loss caused by gap is controlled to be minimal.

In the above prior art, the sleeve 101 and the optical element module 104 are severally installed into the housing 107, causing a troublesome assembly process, inferior workability and high cost.

Further, the sleeve 101 and the optical element module 104 are separately constructed making a gap therebetween, causing a loss of light due to this gap as well as the above-mentioned loss of light due to the gap between the end a (see FIG. 16) and the sleeve 101. These losses of light might affect optical communication.

Furthermore, the receptacle 103 is produced through the steps of: forming the housing 107; producing the optical element module 104; producing the sleeve 101; forming the cap 110; and assembling in sequence thus produced components into the receptacle 103, causing too many steps and high cost thereby.

Further, the step of producing the optical element module 104 includes steps of producing a lead frame having the optical element and forming a molded portion, which protects the lead frame, using a transparent resin.

SUMMARY OF THE INVENTION

It is therefore an object of the present invention to solve the above problem and to provide a receptacle that is useful from the viewpoint of superior workability, low loss of light and low cost, and a process for producing the same. Another object of the present invention is to provide an inexpensive optical connector, which contributes for a better optical communication.

In order to accomplish the above object, a first aspect of the present invention is to provide a process for producing a receptacle, into which an optical plug having ferrule-mounted optical fibers at the end thereof is plugged, comprising the steps of: producing either one lead frame having an optical element, either a light-emitting element or a light-receiving element, or two lead frames consisting of one lead frame having a light-emitting element and another lead frame having a light-receiving element; forming a connector housing containing a socket cavity, into which the optical plug is plugged, a room for accommodating the lead frame and a cylinder being in communication therewith, wherein said cylinder is placed in such a manner that said cylinder is opposite to said end of the optical plug upon plugging of the optical plug into the socket cavity; forming a transparent, hollow and cylindrical clad on an inner circumferential surface of said cylinder after forming said connector housing; accommodating the lead frame into said room in such a manner that the optical element is placed on an axis of said cylinder in which the clad is formed; and producing an optical element module united with said connector housing by filling the inside of the clad and said room with a light-transmitting transparent resin having higher refractive index than that of the clad.

According to the first aspect of the present invention, the number of steps for producing a receptacle becomes small compared to that of a conventional process, enabling a reduction of cost as well as superior workability.

That is, by using the clad and the transparent resin filled therein, the optical element module itself functions as a conventional sleeve, saving a conventional process for making a sleeve. Accordingly, a superfine polishing for end surfaces of optical fibers, by fixing which into a cylindrical holder using glue, is not needed. Further, the optical element module is in one piece in a connector connector housing, resulting in that the optical element module needs no support, saving a conventinal process for making a cap. Furthermore, a conventional process for producing an optical element module as well as an assembly process can be simplified. Thus, superior workability for producing the recepacle is attained.

Since the optical element module itself has a function of a conventional sleeve, the optical element module functions in such a manner as if a conventional sleeve is opposite to an end of the optical fiber when the optical plug is plugged into the receptacle. Further, an optical loss caused by a gap, which is conventionally formed between a sleeve and optical element module, is minimized because of no such a gap, thereby enabling a better optical communication.

Preferably, the lead frame produced in said step of producing a lead frame is transferred to the following step with a carrier attached thereto, which is formed in a manufacture process thereof.

Accordingly, a form of the lead frame becomes stable in the following step, since the following step might be easily executed with a carrier attached the lead frame when the lead frame is composed of a plurality of members. Further, the lead frame is easily held since an area for holding the lead frame increases by a portion of the carrier, being particularly effective in such a case that the lead frame is held in-a mold. Furthermore, when two lead frames are received in the room, a positioning of the lead frames therebetween becomes easy. Therefore, further superior workability and low cost for producing the recepacle has been attained.

Preferably, the lead frame having the light-emitting element and the lead frame having the light-receiving element are alternately formed in the carrier in case of producing two lead frames.

Accordingly, the two lead frames can be received in the room of the connector housing at the same time. Therefore, further superior workability and low cost for producing the recepacle has been attained.

Preferably, a step of cutting the carrier is further included after said following step.

Accordingly, a cutting of the carrior is not necessarily needed in the step of producing the lead frame, enabling further superior workability and low cost for producing the recepacle.

Preferably, the clad is formed by double-shot molding.

Accordingly, a step of the assembly of the receptacle is further simplified, enabling further superior workability and low cost for producing the recepacle.

Preferably, the clad is produced in a separate step in advance and inserted in said step of forming the clad.

Accordingly, the number of steps is decreased even if the production and insertion of the clad is taken into consideration, enabling further superior workability and low cost for producing the recepacle.

Preferably, a light-shielding wall is formed in said room of the connector housing in case of producing two lead frames.

Accordingly, the light-receiving element never receives the light from the light-emitting element, preventing a cross talk and enabling a better optical communication.

A second aspect of the present invention is to provide a receptacle comprising: an optical element module containing either one lead frame having an optical element, either a light-emitting element or a light-receiving element, or two lead frames consisting of one lead frame having a light-emitting element and another lead frame having a light-receiving element; and a connector housing having a room for accommodating and placing the lead frame, into which an optical plug having ferrule-mounted optical fibers at the end thereof is plugged, wherein the connector housing contains a socket cavity for receiving the optical plug and a cylinder being in communication with the socket cavity and said room, the cylinder is formed and placed in such a manner that the cylinder is opposite to said end of the optical plug upon plugging of the optical plug into the socket cavity, the optical element module contains: a transparent, hollow and cylindrical clad formed on an inner circumferential surface of the cylinder; a core forming an optical waveguide in combination with the clad; and a molded portion united with the core for protecting the lead frame, and the core and the molded portion are made of a light-transmitting transparent resin, which is filled into the inside of the clad and said room, having higher refractive index than that of the clad.

According to the second aspect of the present invention, obtained is a receptacle, in which a connector housing and an optical element module are formed in one body by using a transparent resin that is filled into the inside of the clad and the room of the connector housing. An optical waveguide consisting of the clad and the transparent resin that is filled into the inside of the clad is formed, so that the optical element module itself has a function of a conventional sleeve. Further, obtained is a receptacle that has neither a conventional sleeve nor a cap. Accordingly, the producing and assembling processes are simplified, enabling superior workability and low cost for producing the recepacle. Furthermore, since the core and the molded portion are formed in one body, there is no such a gap between the sleeve and the optical element module that a conventional receptacle has, thereby minimizing an optical loss and enabling a better optical communication.

The optical element module functions in such a manner as if a conventional sleeve is opposite to an end of optical fibers when the optical plug is plugged into the receptacle. Accordingly, if an optical element in the lead frame is a light-emitting element, the light emitted from the light-emitting element is transmitted through the molded portion and the optical waveguide and then, entered into the end of the optical fibers. To the contrary, If an optical element in the lead frame is a light-receiving element, the light coming out from the optical fibers is transmitted through the optical waveguide and the molded portion and then, received by the light-receiving element. In case of the two lead frames that simultaneously has a light-emitting element and a light-receiving element, the optical element module has two functions descrived above.

A third aspect of the present invention is to provide an optical connector consisting of a receptacle produced by the process for producing a receptacle according to the first aspect of the present invention and an optical plug, which is plugged into the receptacle, having ferrule-mounted optical fibers at the end thereof.

According to the third aspect of the present invention, an inexpensive optical connector that contributes for a better optical communication is provided.

A fourth aspect of the present invention is to provide an optical connector consisting of the receptacle according to the second aspect of the present invention and an optical plug, which is plugged into the receptacle, having ferrule-mounted optical fibers at the end thereof.

According to the fourth aspect of the present invention, an inexpensive optical connector that contributes for a better optical communication is provided.

DESCRIPTION OF THE PREFERRED EMBODIMENTS

In the following, the preferred embodiments of the present invention are explained with reference to the attached drawings.

To begin with, components constructing an optical connector are explained and then, production (assembly) of a receptacle is explained.

Figure 1:
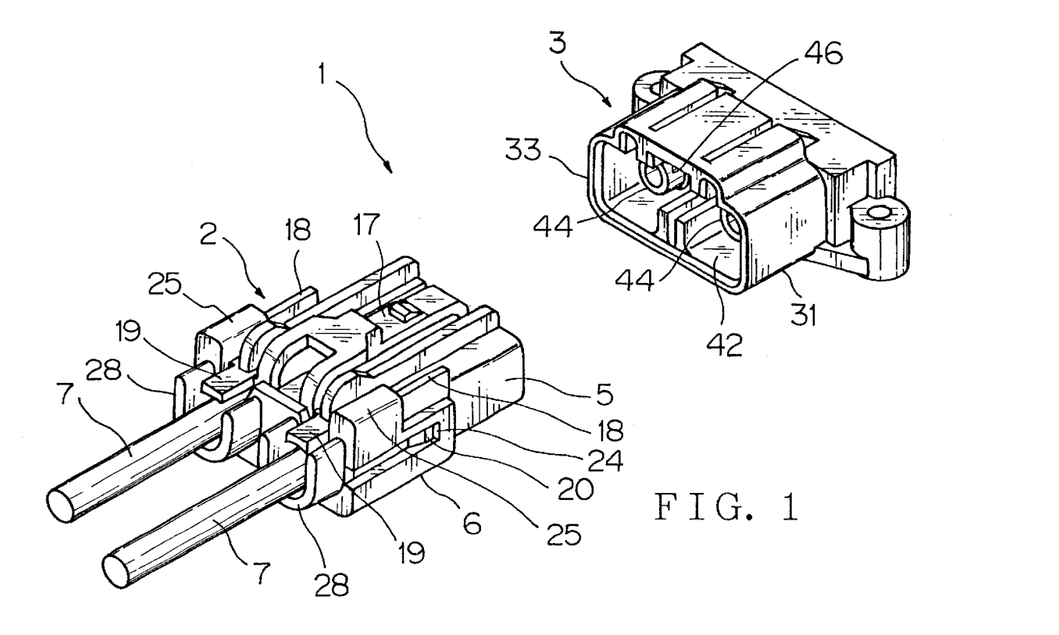
FIG. 1 is an exploded perspective view of an optical connector illustrating a preferred embodiment of a receptacle according to the present invention.

In FIG. 1, shown is an optical connector 1 for use in multiple transmission circuits mounted in vehicles such as motorcars, in which the optical connector 1 consists of an optical plug 2 and a receptacle 3. The receptacle 3 is capable of remarkably superior workability for an assembly thereof compared to a conventional receptacle, minimal optical loss and reduction in cost. The optical connector 1 is constructed so as to contribute for achieving a better optical communication by employing the receptacle 3 as well as to be provided inexpensively.

Figure 2:
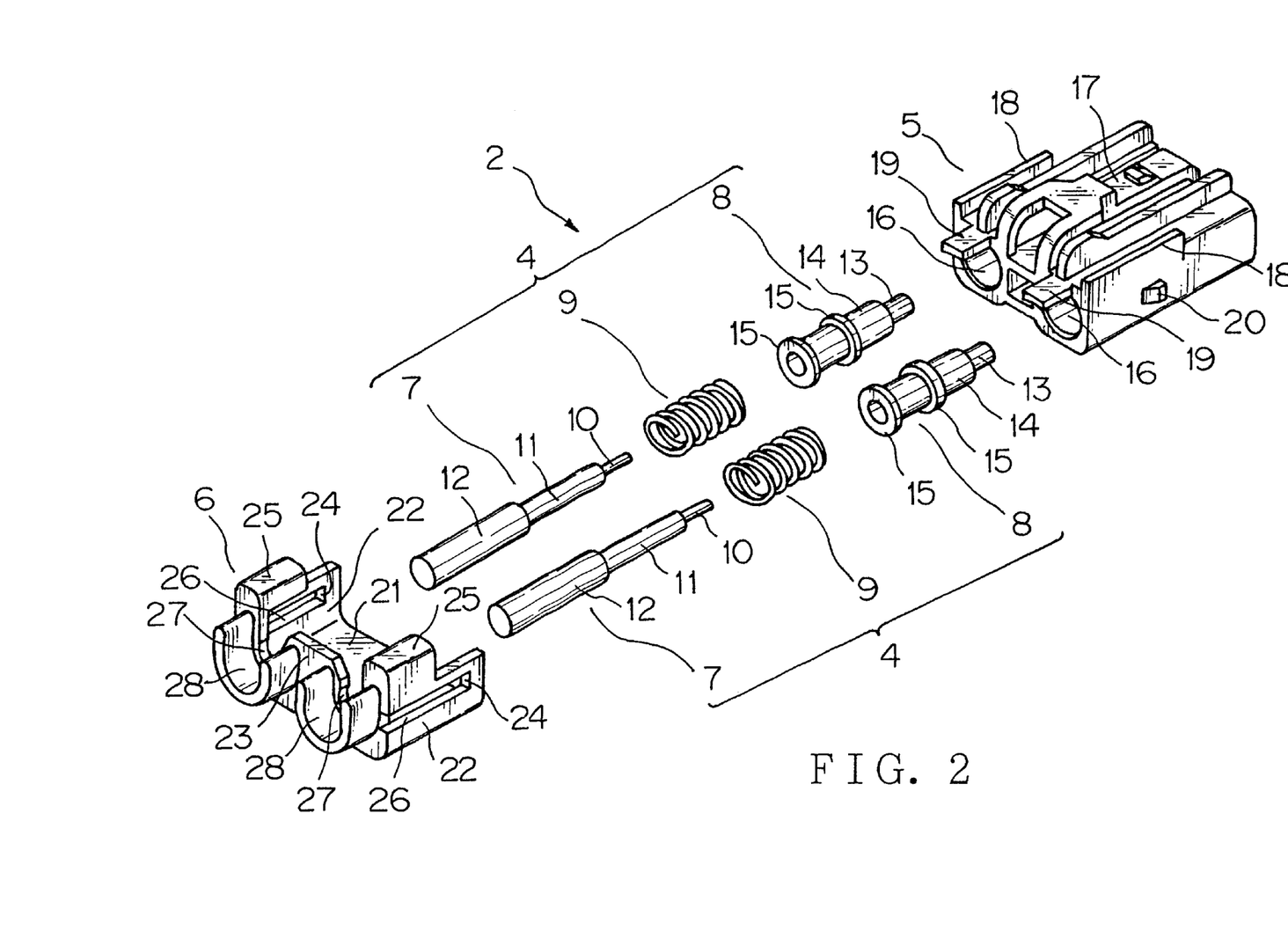
FIG. 2 is an exploded perspective view of the optical plug shown in FIG. 1.

As shown in FIG. 2, the optical plug is consisted of a pair of ferrule assemblies 4, a plug housing 5 into which the ferrule assemblies 4 are inserted and received, and a spring cap 6 that is fitted to the rear of the plug housing 5.

The ferrule assembly 4 is consisted of; optical fiber 7, a ferrule 8 mounted at the end of the optical fiber 7, and a spring 9 into which the optical fiber 7 is inserted.

The optical fiber 7 consisting of a core 10, which is produced by using a transparent resin such as PMMA (poly(methyl methacrylate) (methacrylic resin)), a primary sheath 11 made of synthetic resin, and a secondary sheath 12 also made of synthetic resin, is mounted in a ferrule 8 with its end peeled off.

The ferrule 8 made of synthetic resin has a small-diameter cylindrical portion 13 and a large-diameter cylindrical portion 14, in which the core 10 of the optical fiber 7 is received in the small-diameter cylindrical portion 13 and the primary sheath 11 is received in the large-diameter cylindrical portion 14. The ferrule 8 and the optical fiber 7 are fixed tightly with each other using glue so as to prevent the optical fiber 7 from slipping out from the ferrule 8.

Two flanges 15 are formed around the corresponding large-diameter cylindrical portion 14 and the spring 9 is sandwiched between the flange 15 and the spring cap 6.

The plug housing 5, which is a rectangle-shaped case, has a pair of hollows 16 into which a pair of the ferrule assemblies 4 are received. On the upper wall of the plug housing 5, a locking arm 17, a pair of guide rails 18 and a pair of guide flanges 19 each for guiding the corresponding optical fiber 7 are formed in one body.

On both sidewalls of the plug housing 5, there is provided a projection 20 (only one projection being shown in FIG. 2) to be engaged with the spring cap 6.

The guide rail 18 is a rectangle-shaped piece, which extends along an engaging direction of the spring cap 6 and is placed on the same plane as the above side wall, and formed from the rear end up to about the center of the plug housing 5.

The guide flange 19, which is an overhung projection formed at an introducing position of the optical fiber 7 that is introduced into the plug housing 5 from its rear end, has flexibility so as to prevent the optical fiber 7 from bending upward excessively.

The spring cap 6 consists of a base wall 21 that faces to a bottom wall of the plug housing 5, a pair of side walls 22 that is extended vertically from both side ends of the base wall 21 and faces to a side wall of the plug housing 5, and a rear wall 23 that is extended vertically from a rear end of the base wall 21 and is contiguous to an end of the side walls 22. The spring cap 6 is formed so as to fit to the rear of the plug housing 5.

On each side wall 22, a hollow 24 that is fitted to the projection 20 is formed as well as each guide groove 25 that slides on the corresponding guide rails 18 when the spring cap 6 is fitted to the plug housing 5.

A pair of slits 26 is formed in order to decrease a stiffness of the spring cap 6 when the spring cap 6 is fitted to the plug housing 5.

The guide groove 25, which extends along the fitting direction, is formed in inverse U-shape (not shown in the figure) in cross-sectional view with its side facing to the base wall 21 open, from one end of which the guide rail 18 of the plug housing 5 is inserted. Another end of the guide groove 25 is closed by a rear wall 23.

On the rear wall 23, there are formed a pair of openings 27 each for inserting the corresponding optical fiber 7, on which one end of the spring 9 abuts, and a pair of holders 28 each for holding the corresponding optical fiber 7 introduced from the opening 27, which is formed in inverse U-shape in cross-sectional view.

Figure 3:
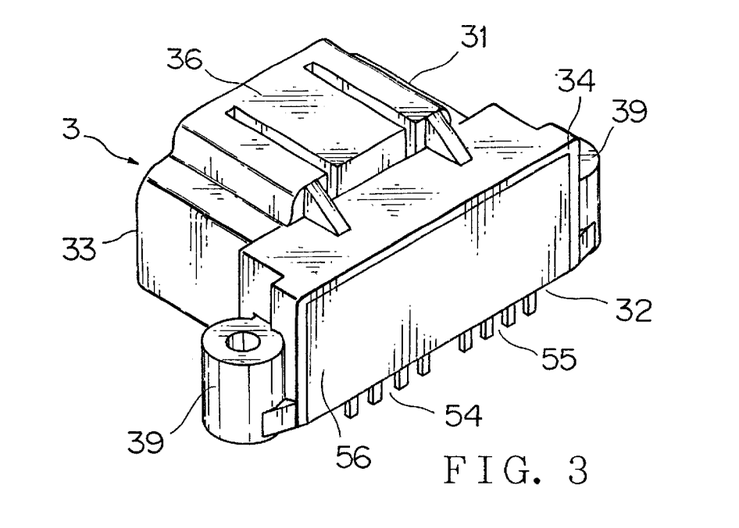
FIG. 3 is a perspective view from the rear side of the receptacle shown in FIG. 1.
Figure 4:
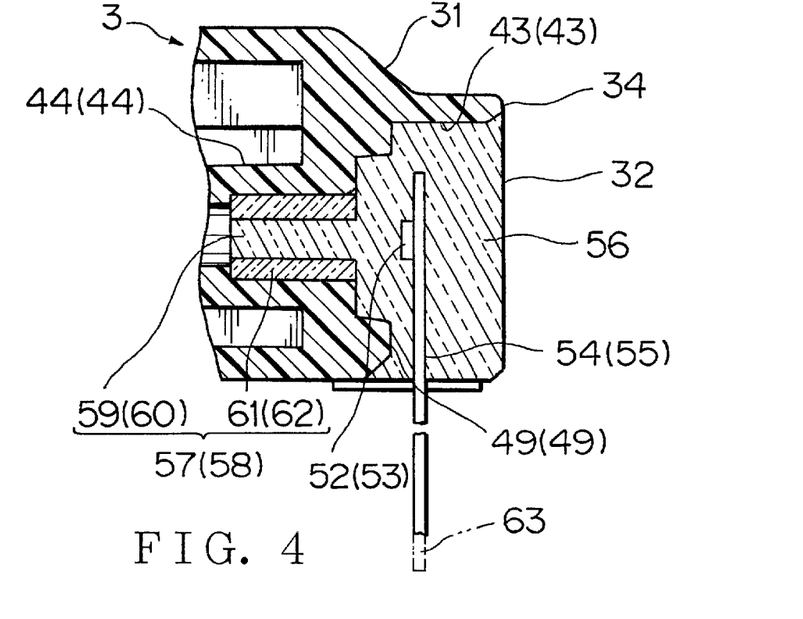
FIG. 4 is a sectional view of the receptacle shown in FIG. 1.
Figure 5:
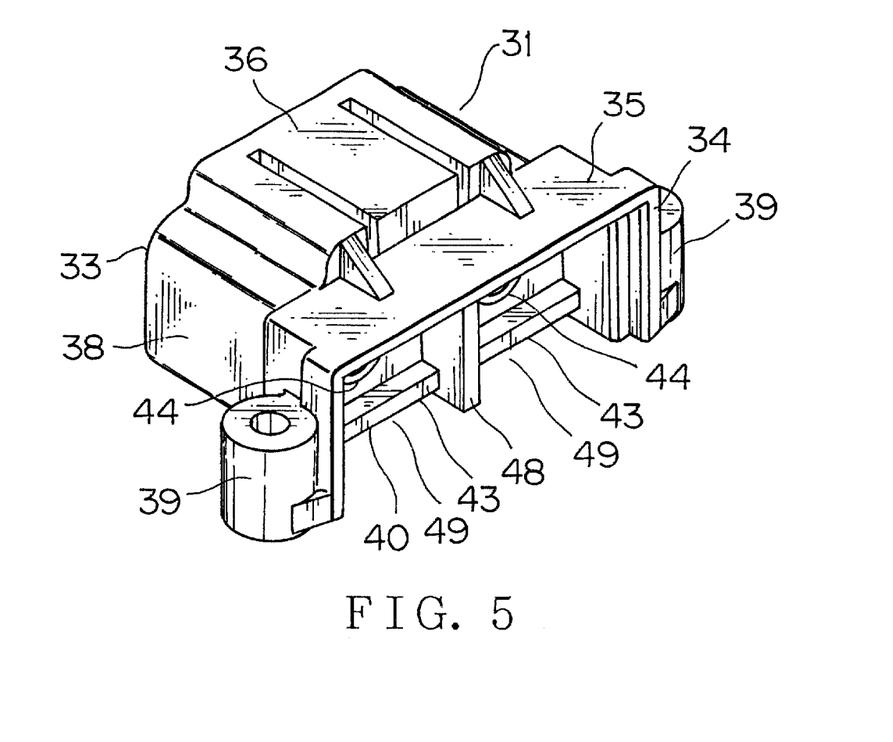
FIG. 5 is a perspective view from the rear side of a connector housing.
Figure 6:
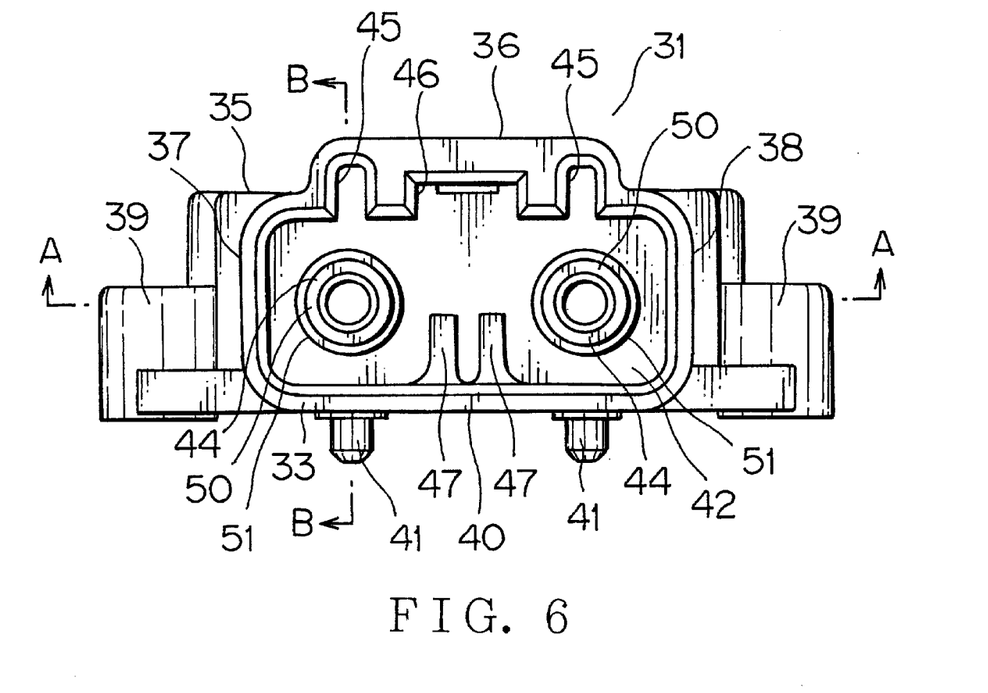
FIG. 6 is a front view of a connector housing.
Figure 7:
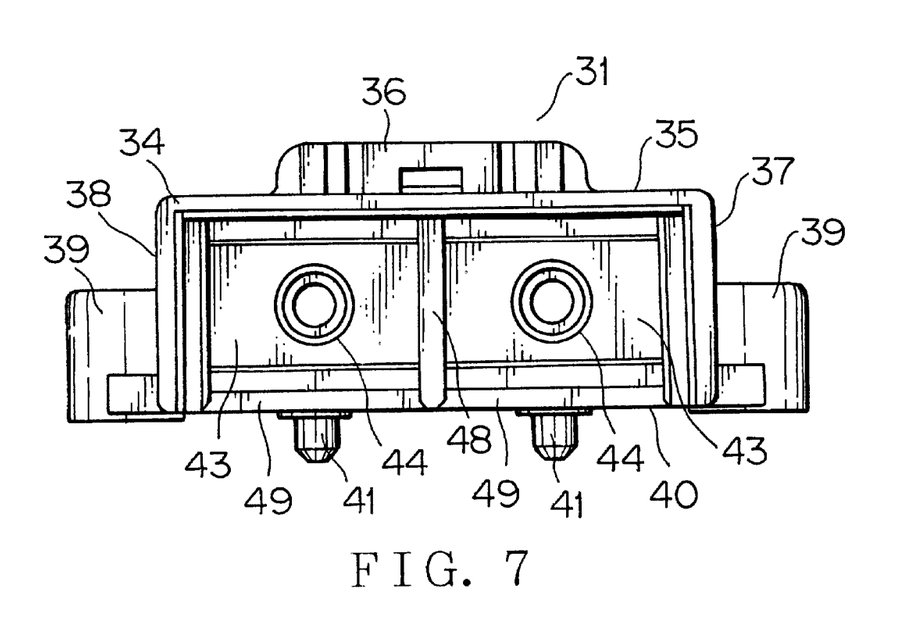
FIG. 7 is a rear elevation view of a connector housing.
Figure 8:
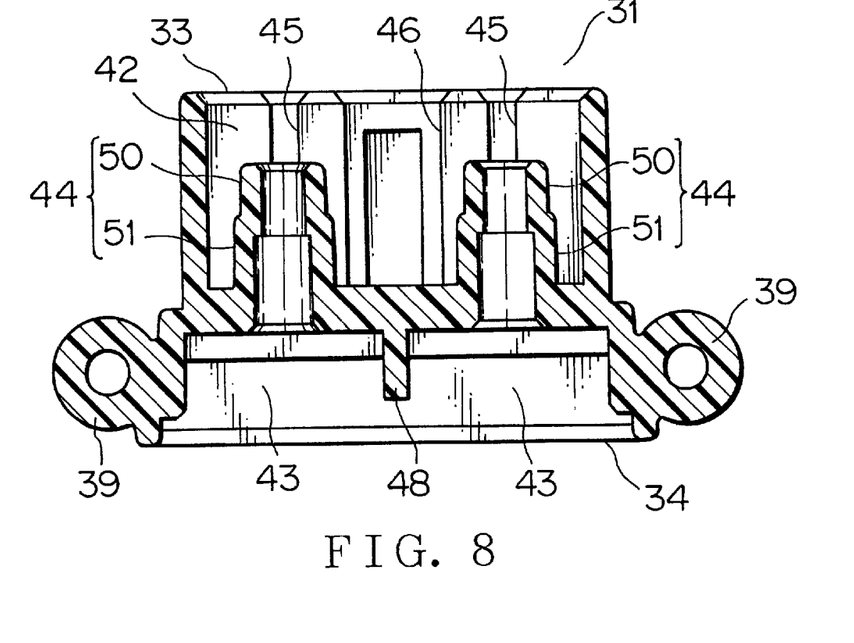
FIG. 8 is a cross-sectional view taken along A—A line in FIG. 6.
Figure 9:
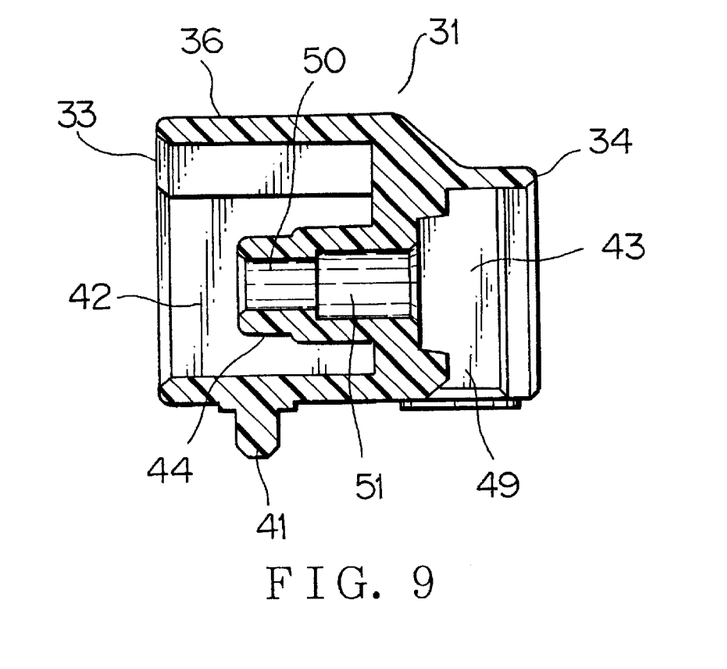
FIG. 9 is a cross-sectional view taken along B—B line in FIG. 6.

In the following, the receptacle 3 is explained. As shown in FIGS. 3 and 4, the receptacle 3 consists of a connector housing 31 and an optical element module 32 (sometimes called as light-receiving/light-emitting module, receiver/transmitter module, or fiber optic transceiver (FOT)) that is formed in one body with the connector housing 31.

The optical plug 2 (see FIG. 1 or 2) is plugged into a front opening 33 of the connector housing 31. The optical element module 32 is formed in one body at a rear opening 34 side of the connector housing 31.

In the following, the connecter housing 31 is explained with reference to FIGS. 5 to 9.

An exterior of the connector housing 31 made of, for example, synthetic resin containing carbon is formed as a rectangle-shaped case having a step around its center in a back-and-forth direction thereof. On an upper wall 35 of the connector housing 31, a guide portion 36 is formed. On a left wall 37 and right wall 38 of the connector housing 31, a cylindrical piece 39 for mounting are formed. On a bottom wall 40 of the connector housing 31, a pair of pins 41 is provided to fix the connector housing 31 with the other object (not shown, such as a wiring board).

In the connector housing 31, there are formed a socket cavity 42 into which the optical plug 2 (see FIGS. 1 or 2) is plugged through the front opening 33, a pair of rooms 43 in which the optical element module 32 is accommodated through the rear opening 34, and a pair of cylinders 44 that is communicated with the socket cavity 42 and the corresponding room 43.

The guide portion 36 on the upper wall 35 protrudes outside, inside of which there are formed a pair of guide grooves 45 that is communicated with the socket cavity 42 and a locking groove 46 for locking the optical plug 2 (see FIGS. 1 or 2).

The socket cavity 42 is formed in such a configuration that the plug housing 5 (see FIG. 1 or 2) of the optical plug 2 can be inserted therein, in which a pair of vertical walls 47 vertically standing up inward is formed at around the center of the bottom wall 40 of the connector housing 31. A front portion of each cylinder 44 protrudes in the socket cavity 42.

A wall 48 that is capable of light shielding (i.e. preventing a cross talk) separates the two rooms 43 with each other. At the bottom wall 40 of the connector housing 31, a pair of terminal introducing portions 49 is formed.

The terminal introducing portion 49, which is formed by notching the bottom wall 40 side of the rear opening 34, is open backward.

The cylinder 44 is formed to have a step both inner and outer sides thereof, in which each ferrule 8 of the optical plug 2 (see FIGS. 1 or 2) is inserted into a corresponding front small-diameter portion 50, while clads 61 and 62 (described later on) each are formed in a corresponding rear large-diameter portion 51.

The cylinder 44 is formed in such a manner that axes of the ferrule 8 and a core 59 or 60 coincide (not shown in the figure) with an axis of the corresponding cylinder 44.

As explained later on, when clads 61 and 62 are produced in a separate step in advance and inserted into the rear large-diameter portion 51 (see FIG. 11B), preferably, for example, the rear large-diameter portion 51 is provided with press-fitting projections (not shown in the figure) at even intervals.

In the following, a structure of the optical element module 32 is explained.

As shown in FIGS. 3 and 4, the optical element module 32 consists of a pair of lead frames 54 and 55 having corresponding optical elements 52 and 53, a molded portion 56 for protecting the lead frames, and a pair of optical waveguides 57 and 58 provided in accordance with positions of the corresponding optical elements 52 and 53.

In FIG. 4, for example, when the optical element 52 on the lead frame 54 is a light-emitting element (for example, a light-emitting diode (LED)), then the optical element 53 on the lead frame 55 is a light-receiving element (for example, photodiode (PD)).

The molded portion 56, which is made of a light-transmitting transparent resin (for example, epoxy resin; preferably having an equal refractive index to that of the optical fiber 7), is formed in such a manner that the molded portion 56 covers about upper half of the lead frames 54 and 55 containing the optical elements 52 and 53, respectively.

The optical waveguide 57 consists of a core 59, made of the same material as the molded portion 56, and a clad 61 formed around the core 59, wherein the optical element 52 is placed on an axis of the core 59. The optical waveguide 58 is constructed in a similar way.

An end surface of the core 59 and that of the clad 61 is on the same plane. Also, an end surface of the core 60 and that of the clad 62 is on the same plane.

The clad 61 is made of transparent resin having a smaller refractive index than that of the core 59. Also, The clad 62 is made of transparent resin having a smaller refractive index than that of the core 60.

Numerical aperture (N.A.) of the waveguide 57 and that of the waveguide 58 are set up to be larger than that of the corresponding core 10 (see FIG. 2) of the optical fiber 7.

External form of the waveguide 57 and 58 is matched with that of a conventional sleeve 101 (see FIGS. 14 and 15) in this preferred embodiment.

An inner surface of the clad 61 and 62 may be tapered so that a shape of the corresponding core 59 and 60 becomes a circular truncated cone.

In the following, a process (producing steps) for producing the receptacle 3 (see FIG. 3) is explained with reference to FIGS. 10 to 13.

The receptacle 3 is produced through a process containing the steps of producing the lead frame, molding the connector housing, forming the clad, receiving the lead frame into the room, and producing the optical element module.

Figure 10:
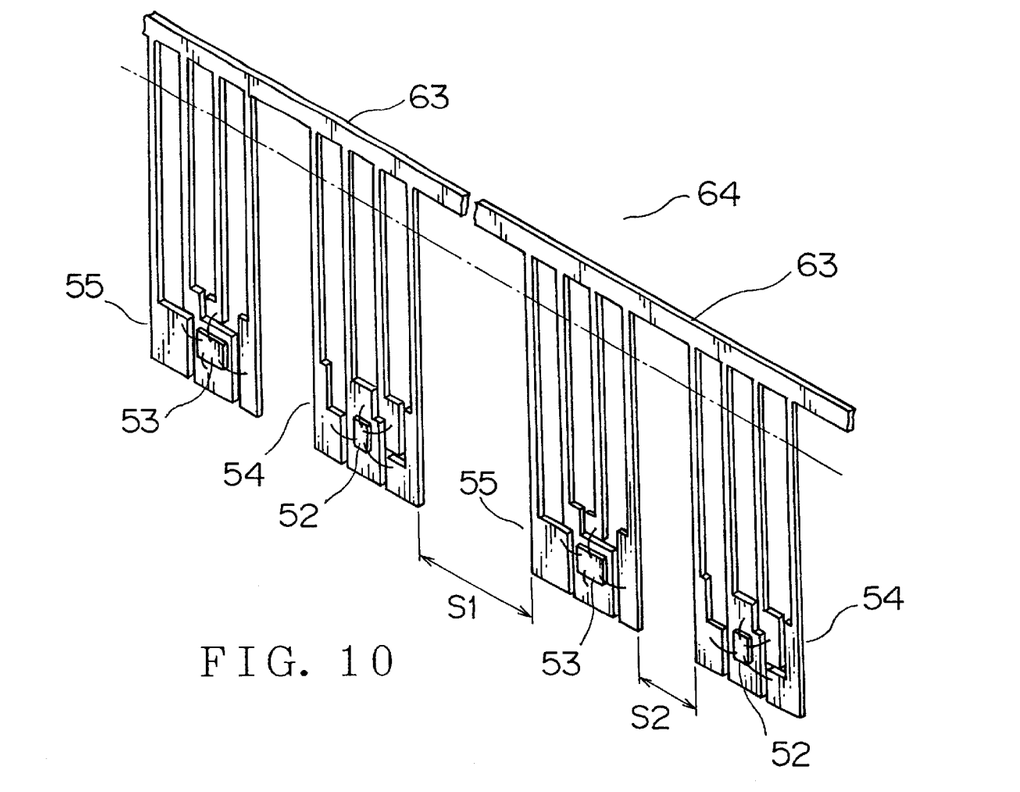
FIG. 10 is a perspective view of a lead frame assembly illustrating a step of producing a lead frame.

In the following, the step of producing the lead frame is explained. As shown in FIG. 10, in the step of producing the lead frame, a electrically conductive metal plate is stamped out by a press work, then the optical elements 52 and 53 are alternately mounted thereon, wire bondings are carried out, the corresponding lead frames 54 and 55 are set and then, the lead frames are connected in a row through a carrier 63. Differently from the above step, wire-bonded lead frames mounting the optical element 52 may be produced with connected each other in a row.

In FIG. 10, thus produced lead frame assembly 64, in which the lead frames are connected with each other in a row, is shown.

A distance S1 between each set having the lead frames 54 and 55 is set up to be long so that a plurality of receptacles 3 (see FIG. 3) can be produced at a time. A distance S2 between the lead frames 54 and 55 is set up in such a manner that a distance between the optical elements 52 and 53 is equal to a distance between the two cylinders 44 (see FIGS. 4 and 7).

The carrier 63 is not separated by cutting in the present step of producing the lead frame, that is, the lead frames 54 and 55 are transferred to the following step with a carrier attached thereto. Accordingly, a form of the lead frame becomes stable in the following step. Further, the lead frames 54 and 55 are easily held. Furthermore, when the lead frames 54 and 55 are received in the rooms 43 (see FIG. 4), a positioning of the lead frames 54 and 55 with each other becomes easy.

A step of cutting the carrier 63 is arranged sometime in the following step. The carrier 63 may be cut in the present step of producing the lead frame, however in this case, a caution for preventing the lead frames 54 and 55 from coming apart is needed. The carrier 63 is cut at a position indicated by a fictitious line shown in FIG. 10.

The carrier 63 may be cut for each set having the lead frames 54 and 55. The lead frames 54 and 55 may be separately produced and then, a set consisting of the lead frames 54 and 55 one of each may be produced with the carrier 63 attached thereto.

In the following, the step of molding the connector housing is explained. In this step that is carried out separately from the producing step of the lead frame, the connector housing 31, of which shape is shown in FIGS. 5 to 9, is produced by injection molding.

After completion of the steps of producing the lead frame and molding the connector housing, the clad is formed.

Figure 11A:
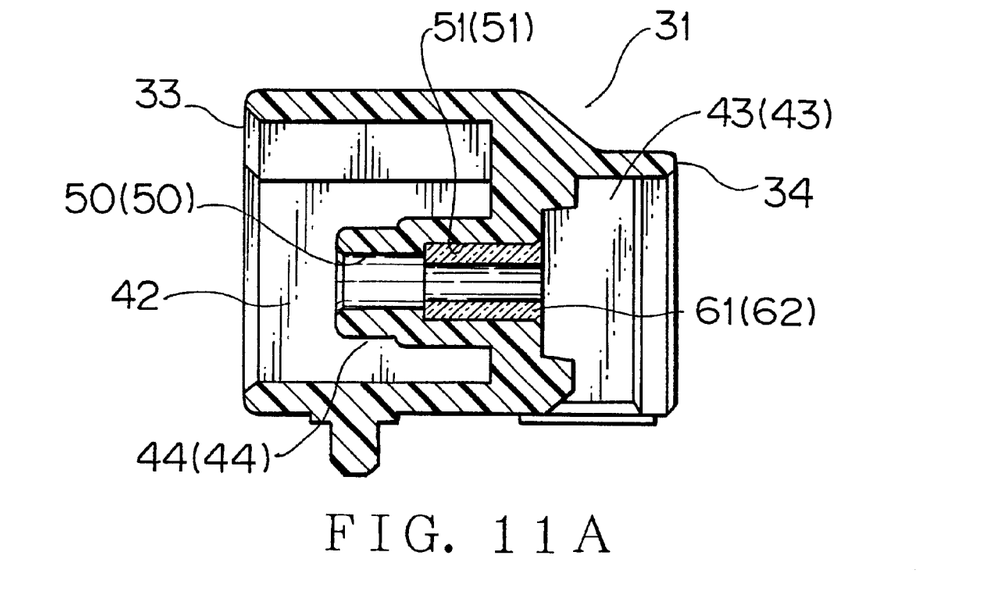
FIG. 11A is a sectional view of a connector housing illustrating a state, in which a clad is formed by double-shot molding.
Figure 11B:
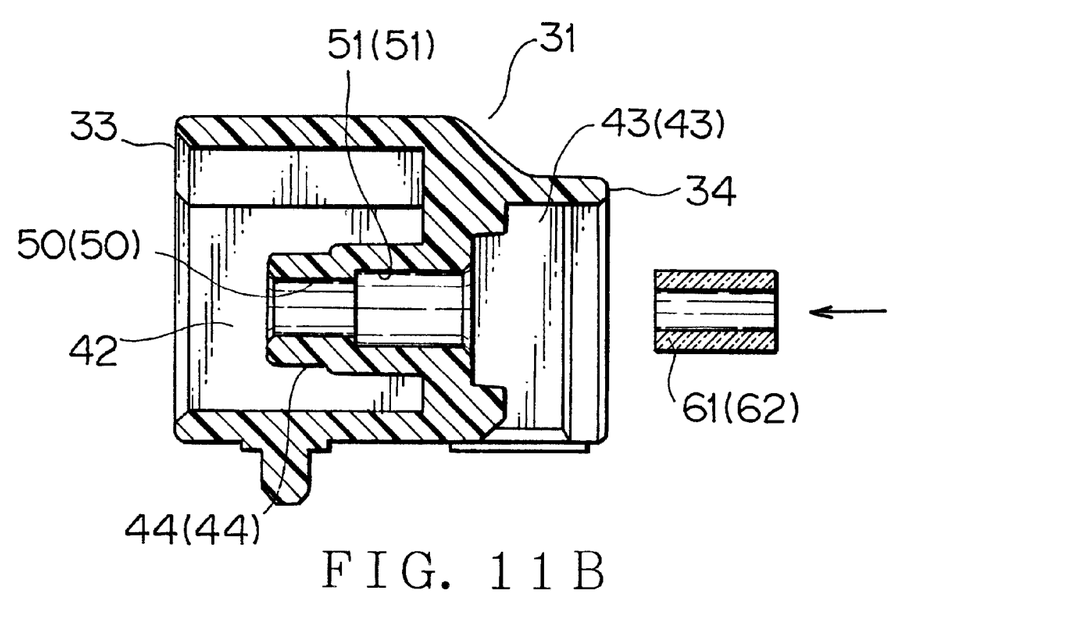
FIG. 11B is a sectional view of a connector housing illustrating a state, in which a clad is formed by inserting a corresponding component produced in a separate step in advance.

As shown in FIGS. 11A and 11B, in the step of forming the clad, the clads 61 and 62 are formed on an inner surface of the corresponding rear large-diameter portion 51 of the cylinder 44. Either of the following two processes can be employed.

In FIG. 11A, a process is shown, in which the clads 61 and 62 are formed on the inner surface of the corresponding rear large-diameter portion 51 by double-shot molding. While, in FIG. 11B, a process is shown, in which the cylindrical clads 61 and 62 are produced in a separate step in advance and then, inserted into the corresponding rear large-diameter portion 51. Either process contributes for cost reduction.

After completion of the step of forming the clad, the lead frame is received into the room.

Figure 12:
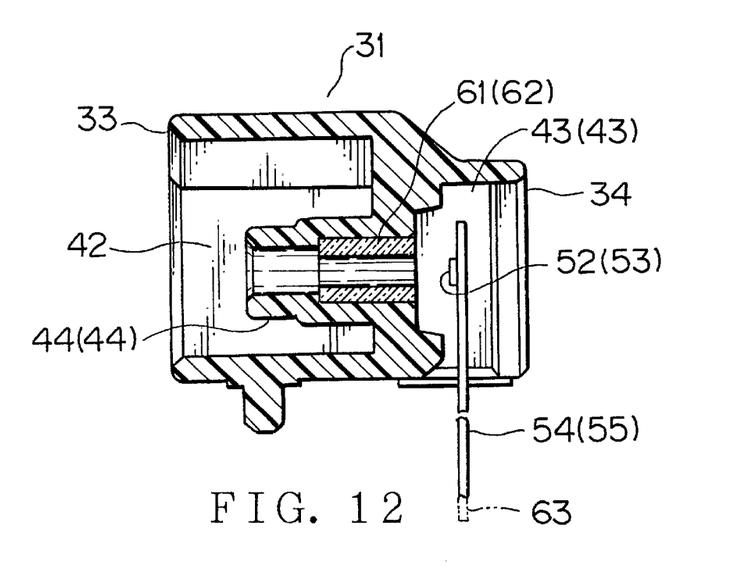
FIG. 12 is a sectional view of a connector housing illustrating a step of accommodating a lead frame into a room.

As shown in FIG. 12, in the step of receiving the lead frame in the room, the lead frame 54 and 55 with the carrier 63 attached thereto are received in the corresponding room 43 of the connector housing 31 that is set in a mold (not shown). The lead frames 54 and 55 are received in the corresponding rooms 43 in such a manner that the optical elements 52 and 53 are placed on an axis of the corresponding cylinders 44.

After completion of the step of receiving the lead frame in the room, the optical element module is produced.

Figure 13:
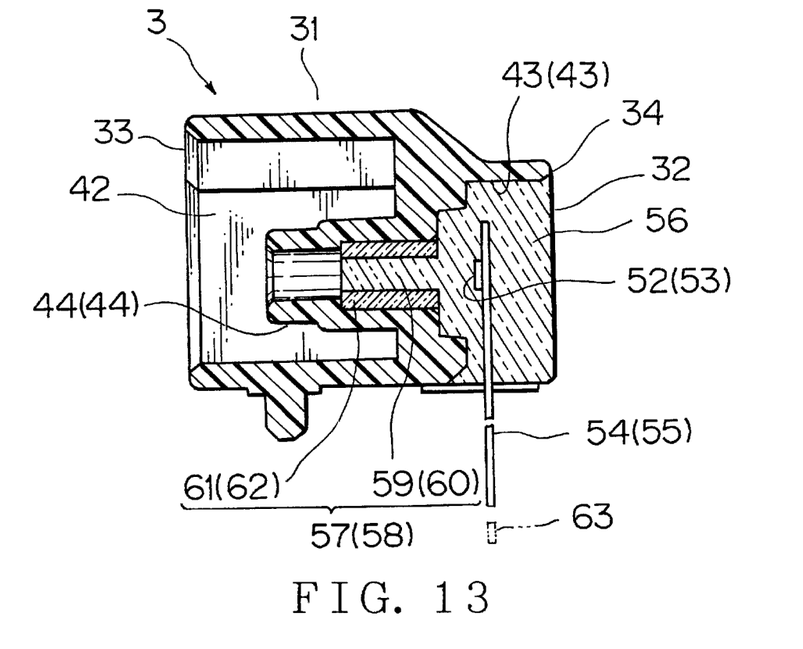
FIG. 13 is a sectional view of a connector housing illustrating a step of producing an optical element module.

As shown in FIG. 13, in the step of producing the optical element module, the transparent resin is filled into the inside of the clads 61 and 62, and the rooms 43 so as to form the molded portion 56 and the core 59 and 60, thereby producing the optical element module 32.

Thus, the optical element module 32 is formed in one body with the connector housing 31. A combination of the core 59 and the clad 61 forms the optical waveguide 57, which is in one body with the molded portion 56. Also, a combination of the core 60 and the clad 62 forms the optical waveguide 58, which is in one body with the molded portion 56.

Finally, the carrier 63 is cut, then the receptacle 3 is completed.

The receptacle 3 thus produced according to the above process contributes for a reduction of cost as well as superior workability, since the number of steps for producing the receptacle becomes small compared to that of a conventional process.

The optical element module 32 itself has a function of a sleeve 101 (see FIGS. 14 and 15) by employing the clads 61 and 62 as well as the transparent resin filled into the inside of the clad 61 and 62, saving a producing step of a conventional sleeve. Accordingly, a superfine polishing for end surfaces of optical fibers 113, by fixing which into the cylindrical holder 114 using glue, is not needed.

The optical element module 32 is in one piece in the connector connector housing 31, resulting in that the optical element module 32 needs no support, saving a process for making a conventinal cap 110 (see FIGS. 14 and 15).

A conventional process for producing an optical element module 104 (see FIGS. 14 and 15) as well as an assembly process can be simplified since the optical element module 32 is in one piece in the connector housing 31. Thus, superior workability for producing the recepacle is attained.

An optical loss caused by a gap, which is conventionally formed between the sleeve 101 (see FIGS. 14 and 15) and the optical element module 104, is minimized because of no such a gap in the receptacle 3.

Since the optical element module 32 itself has a function of the conventional sleeve 101 (see FIGS. 14 and 15), the optical element module 32 functions in such a manner as if the conventional sleeve 101 is opposite to an end of the optical fiber 7 when the optical plug 2 is plugged into the receptacle 3.

Therefore, according to the present invention, a receptacle that is useful from the viewpoint of superior workability, low loss of light and low cost can be provided.

Since the optical connector 1 is constructed containing the receptacle 3, an inexpensive optical connector that contributes for a better optical communication can be provided.

The aforementioned preferred embodiments are described to aid in the understanding of the present invention, and variations may be made by one skilled in the art without departing from the spirit and scope of the present invention.

For example, the aforementioned connector housing 31 is constructed in such a manner that the connector housing 31 receives a pair of lead frames 54 and 55 of the optical element module 32. Differently from this construction, the connector housing 31 may be constructed in such a manner that the connector housing 31 receives either the lead frame 54 or the lead frame 55.

What is claimed is:

1. A process for producing a receptacle, into which an optical plug having ferrule-mounted optical fibers at the end thereof is plugged, comprising the steps of:
producing either one lead frame having an optical element, either a light-emitting element or a light-receiving element, or two lead frames consisting of one lead frame having a light-emitting element and another lead frame having a light-receiving element;
forming a connector housing containing a socket cavity, into which the optical plug is plugged, a room for accommodating the lead frame and a cylinder being in communication therewith, wherein said cylinder is placed in such a manner that said cylinder is opposite to said end of the optical plug upon plugging of the optical plug into the socket cavity;
forming a transparent, hollow and cylindrical clad on an inner circumferential surface of said cylinder after forming said connector housing;
accommodating the lead frame into said room in such a manner that the optical element is placed on an axis of said cylinder in which the clad is formed; and
producing an optical element module united with said connector housing by filling the inside of the clad and said room with a light-transmitting transparent resin having higher refractive index than that of the clad.

2. The process for producing a receptacle according to claim 1, wherein the lead frame produced in said step of producing a lead frame is transferred to the following step with a carrier attached thereto, which is formed in a manufacture process thereof.

3. The process for producing a receptacle according to claim 2, wherein the lead frame having the light-emitting element and the lead frame having the light-receiving element are alternately formed in the carrier in case of producing two lead frames.

4. The process for producing a receptacle according to claim 2 or 3, wherein a step of cutting the carrier is further included after said following step.

5. The process for producing a receptacle according to claim 1, 2 or 3, wherein the clad is formed by double-shot molding.

6. The process for producing a receptacle according to claim 4, wherein the clad is formed by double-shot molding.

7. The process for producing a receptacle according to claim 1, 2 or 3, wherein the clad is produced in a separate step in advance and inserted in said step of forming the clad.

8. The process for producing a receptacle according to claim 4, wherein the clad is produced in a separate step in advance and inserted in said step of forming the clad.

9. The process for producing a receptacle according to claim 1, 2 or 3, wherein a light-shielding wall is formed in said room of the connector housing in case of producing two lead frames.

10. The process for producing a receptacle according to claim 4, wherein a light-shielding wall is formed in said room of the connector housing in case of producing two lead frames.

11. The process for producing a receptacle according to claim 5, wherein a light-shielding wall is formed in said room of the connector housing in case of producing two lead frames.

12. The process for producing a receptacle according to claim 6, wherein a light-shielding wall is formed in said room of the connector housing in case of producing two lead frames.

13. The process for producing a receptacle according to claim 7, wherein a light-shielding wall is formed in said room of the connector housing in case of producing two lead frames.

14. A receptacle comprising:
an optical element module containing either one lead frame having an optical element, either a light-emitting element or a light-receiving element, or two lead frames consisting of one lead frame having a light-emitting element and another lead frame having a light-receiving element; and
a connector housing having a room for accommodating and placing the lead frame, into which an optical plug having ferrule-mounted optical fibers at the end thereof is plugged, wherein the connector housing contains a socket cavity for receiving the optical plug and a cylinder being in communication with the socket cavity and said room,
the cylinder is formed and placed in such a manner that the cylinder is opposite to said end of the optical plug upon plugging of the optical plug into the socket cavity,
the optical element module contains: a transparent, hollow and cylindrical clad formed on an inner circumferential surface of the cylinder; a core forming an optical waveguide in combination with the clad; and a molded portion united with the core for protecting the lead frame, and
the core and the molded portion are made of a light-transmitting transparent resin, which is filled into the inside of the clad and said room, having higher refractive index than that of the clad.

15. An optical connector consisting of a receptacle produced by the process for producing a receptacle according to claim 1 and an optical plug, which is plugged into the receptacle, having ferrule-mounted optical fibers at the end thereof.

16. An optical connector consisting of the receptacle according to claim 14 and an optical plug having ferrule-mounted optical fibers at the end thereof, which is plugged into the receptacle.

* * * * *